July 9, 1957 R. M. FROST 2,798,930
CONVERTIBLE RANGE
Filed Nov. 20, 1953 13 Sheets-Sheet 3

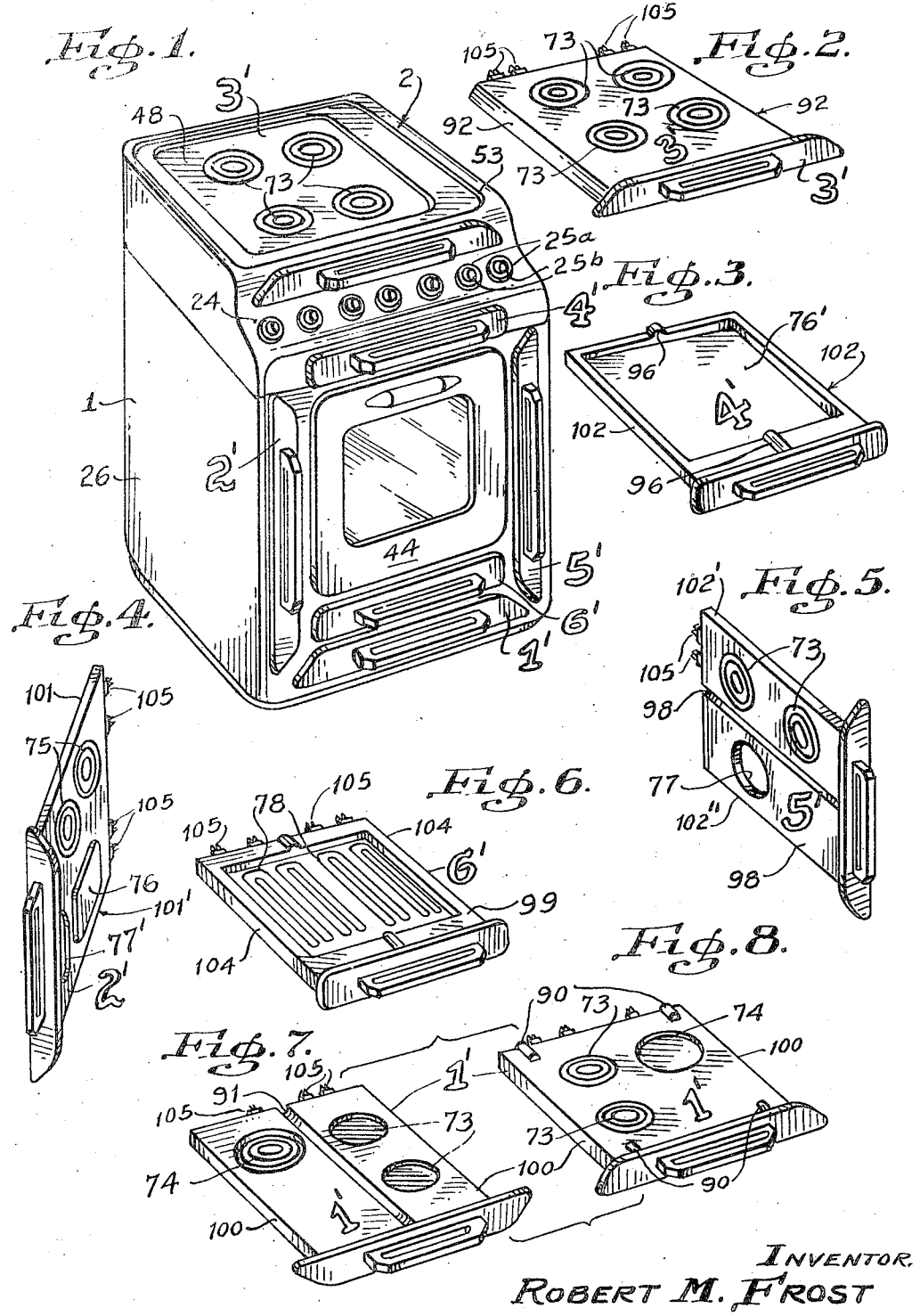

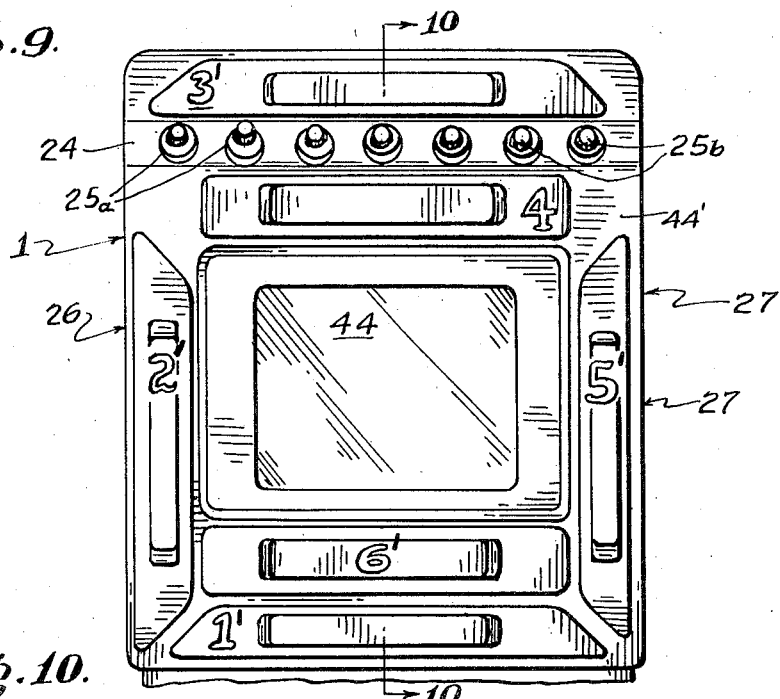
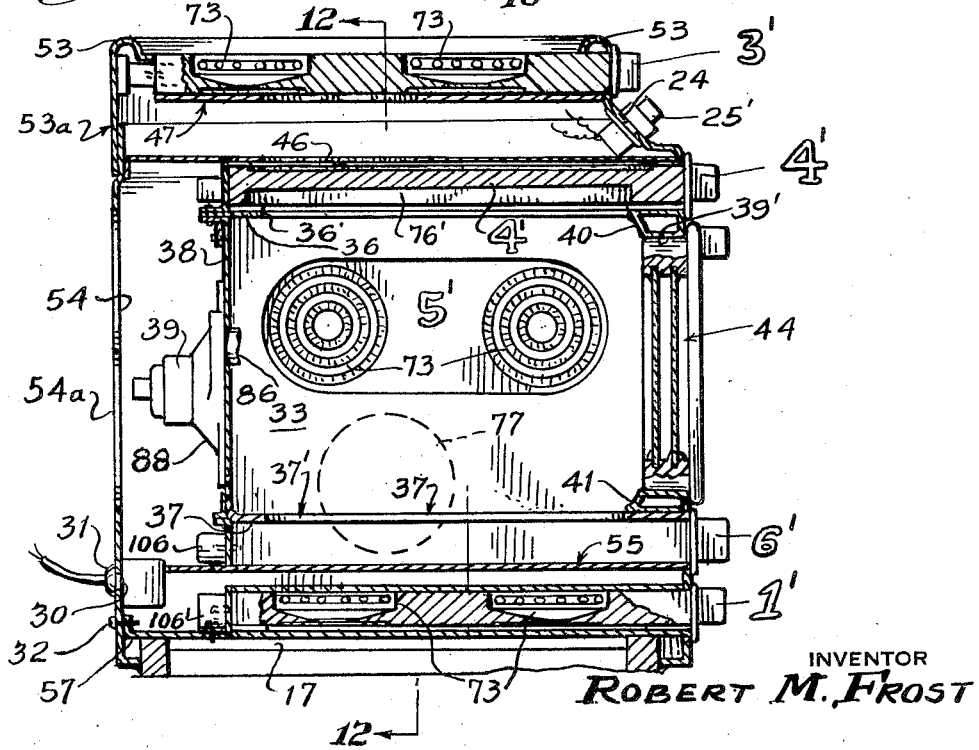

INVENTOR.
ROBERT M. FROST

INVENTOR,
ROBERT M. FROST

July 9, 1957  R. M. FROST  2,798,930
CONVERTIBLE RANGE
Filed Nov. 20, 1953  13 Sheets-Sheet 5

INVENTOR.
ROBERT M. FROST

July 9, 1957 R. M. FROST 2,798,930
CONVERTIBLE RANGE
Filed Nov. 20, 1953 13 Sheets-Sheet 6

INVENTOR
ROBERT M. FROST

INVENTOR.
ROBERT M. FROST

July 9, 1957 R. M. FROST 2,798,930
CONVERTIBLE RANGE
Filed Nov. 20, 1953 13 Sheets-Sheet 8
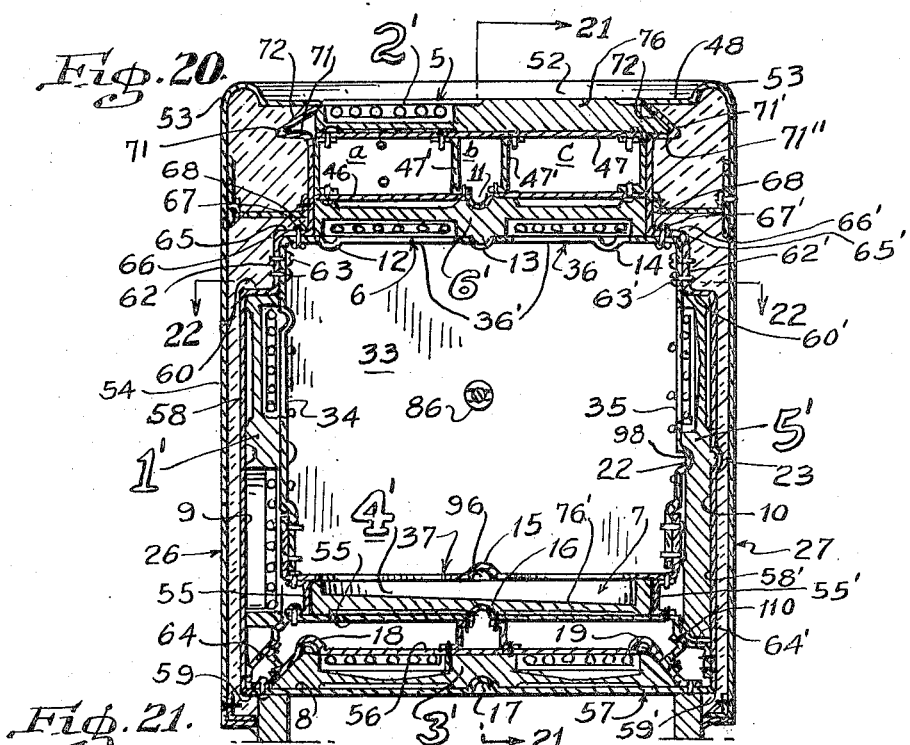
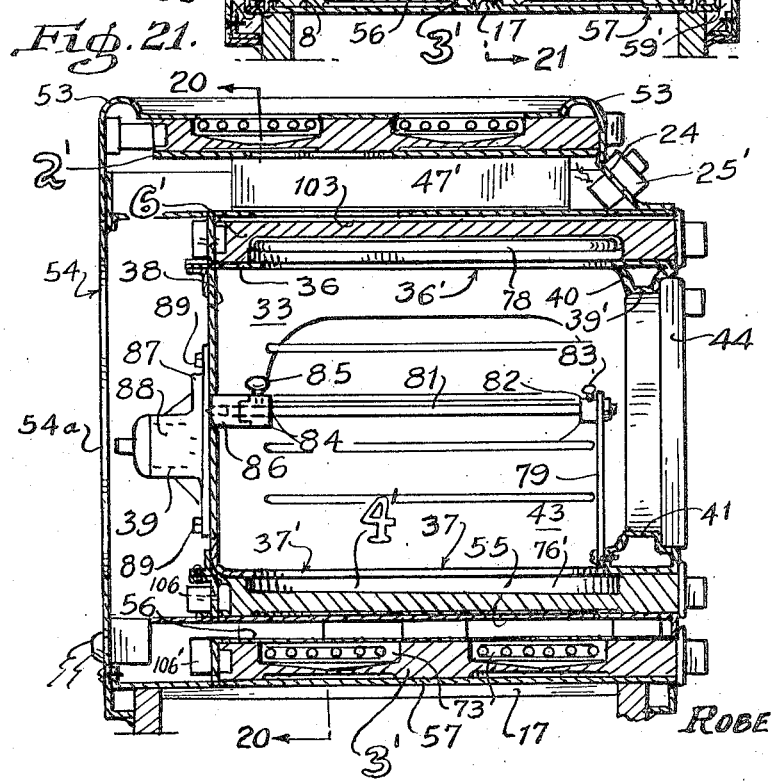
INVENTOR.
ROBERT M. FROST

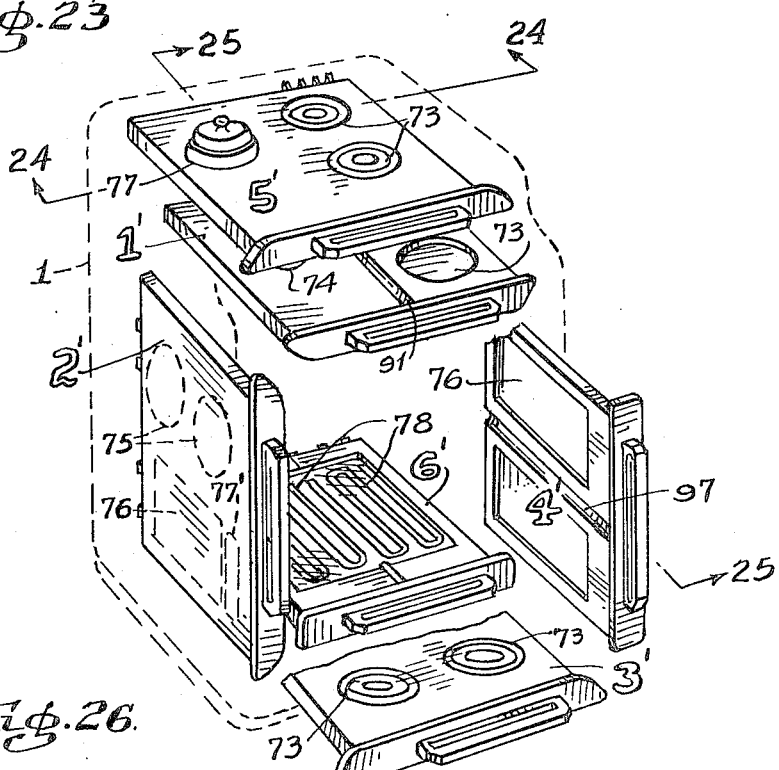
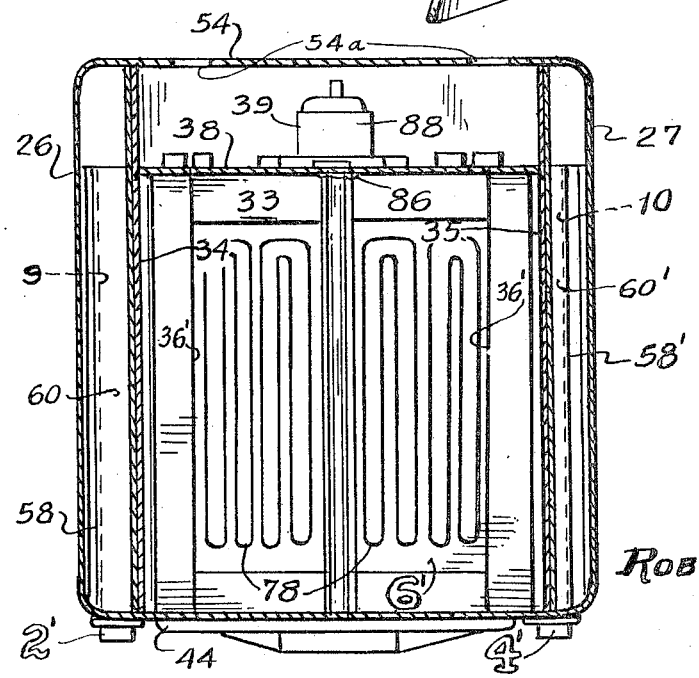

July 9, 1957 R. M. FROST 2,798,930
CONVERTIBLE RANGE
Filed Nov. 20, 1953 13 Sheets-Sheet 10

INVENTOR,
ROBERT M. FROST

July 9, 1957 R. M. FROST 2,798,930
CONVERTIBLE RANGE
Filed Nov. 20, 1953 13 Sheets-Sheet 11
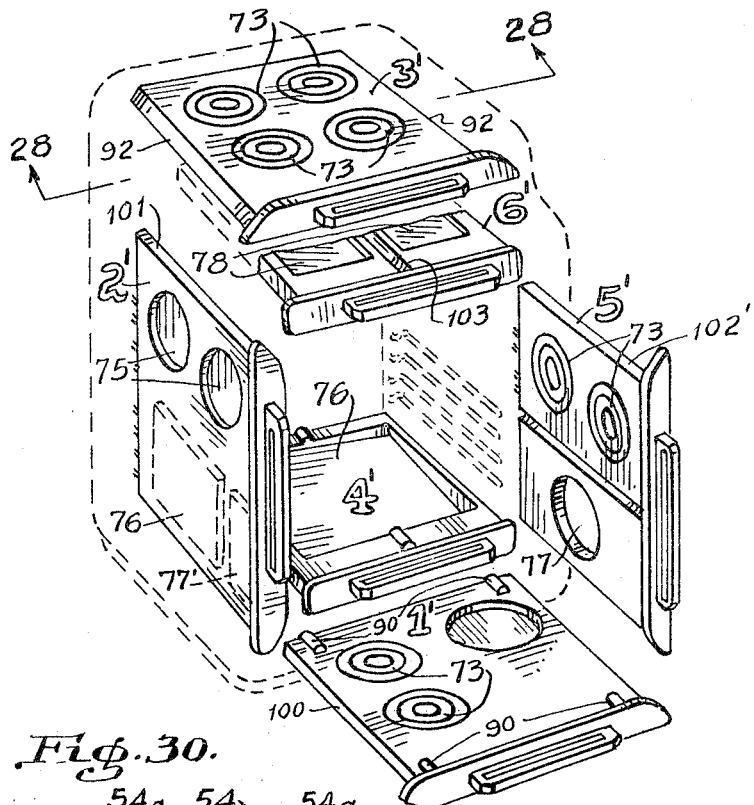
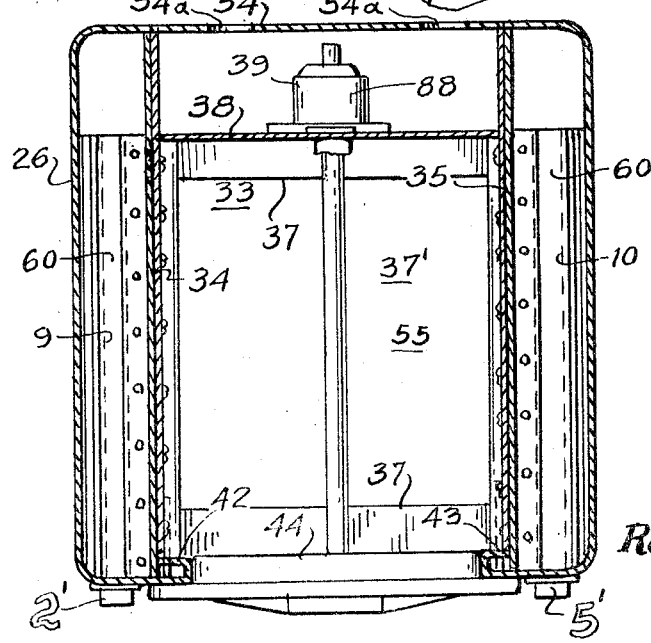
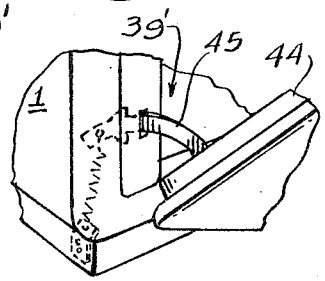
INVENTOR
ROBERT M. FROST July 9, 1957

R. M. FROST 2,798,930

CONVERTIBLE RANGE

Filed Nov. 20, 1953

INVENTOR
ROBERT M. FROST

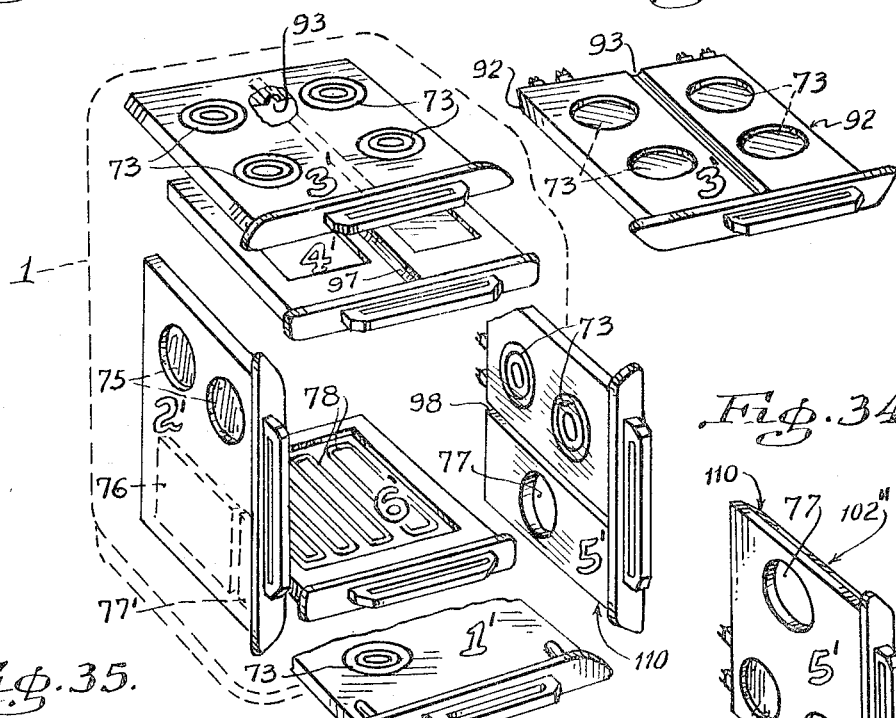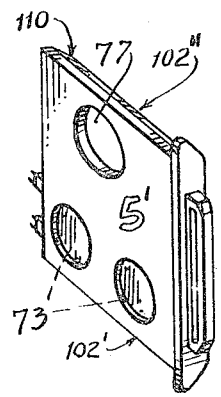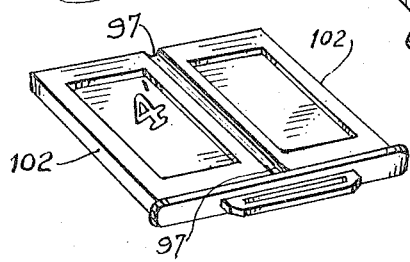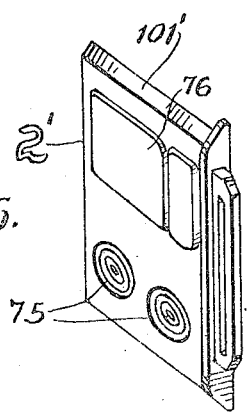

United States Patent Office 2,798,930
Patented July 9, 1957

2,798,930

CONVERTIBLE RANGE

Robert M. Frost, San Diego, Calif.

Application November 20, 1953, Serial No. 393,435

15 Claims. (Cl. 219—35)

My invention relates to a new electrically heated range or stove which can be converted to perform different methods of cooking by various arrangements of the heating components within the cabinet of the range.

This invention also relates primarily to a cooking stove adaptable to be used where stove space is limited, such as in apartments, etc., where a kitchenette or other small space is provided, but where the capabilities of a full-sized range are desired.

The range of my invention is not limited to the above adaptation, as it may, by a change in the design of the enclosing cabinet, function with the major portion of the stove located in the wall of a kitchen with the front fully exposed, and it could be so installed with an open space provided above the range to allow ample space for the top thereof to be used.

Another object of my invention is to provide a cooking range which can be easily transformed to various types of cooking methods by the use of members or trays equipped with heating units, each tray having a different arrangement of the heating units and each of the trays insertable in and removable from a predetermined location in a range cabinet, and each combination making it usable for a plurality of methods of cooking.

It is another object of my invention to provide a range which, by the use of keyed heating units within its structure, may be changed from a range suitable to one group of cooking methods to that of another group of cooking methods to which the range is adaptable.

Another object of my invention is to provide each of the heating units with means for localizing each of the heating trays so they can be inserted only in the slot or slots in which they are designed to be placed by a prearranged system of keys or keyways on the trays and keys or keyways in the tray slots located in the cabinet of the range.

Another object of my invention is to provide a cooking range in which any of the predetermined cooking groups are automatically electrically connected to a remote source of electrical input and to their respective unit control dials mounted on the exterior of the cabinet, upon their insertion into the respective slots provided in the range cabinet.

Another object of my invention is to provide electrical sockets so placed in mating relationship that upon the complete insertion of a tray allocated to a predetermined position in an opening in the range cabinet, it is automatically electrically connected to the correct electrical terminal or terminals.

Another object of my invention is to provide a cooking range having a plurality of heating trays which are so keyed in relation to the keyed cabinet openings provided for their insertion that a predetermined combination of heating units may be assembled within the range cabinet suitable for a predetermined group of different cooking methods.

Yet another object is the provision of trays having novel heating unit arrangements.

These and other objects of my invention will be more clearly understood by reference to the drawings, in which:

Fig. 1 is an isometric view of the exterior of the cabinet of the range with all of the tray units in place;

Fig. 2 is an isometric view of one of the trays provided with four heating units;

Fig. 3 is a view similar to Fig. 2, illustrating a tray suitable for catching the drippings from the food while cooking;

Fig. 4 is an isometric view of one of the trays provided with two surface heating units, a griddle and grease pockets;

Fig. 5 is a view similar to Fig. 4 having two surface heating units and an opening;

Fig. 6 is a view similar to Fig. 3 of a tray provided with four rectangular heating units;

Fig. 7 is a view similar to Fig. 6 of a tray provided with one heating unit on the side illustrated.

Fig. 8 is a view of the same tray as illustrated in Fig. 7, showing the other side which is provided with two surface heating units;

Fig. 9 is a front view of the range cabinet showing the six trays of Figs. 2 to 7 in one of the tray combinations;

Fig. 10 is a view in section taken on the line 10—10 of Fig. 9;

Fig. 20 is a view in section taken on the line 20—20 of Fig. 19;

Fig. 21 is a view in section taken on the line 21—21 of Fig. 20;

Fig. 23 is an isometric view, illstrating the arrangement of the trays for two surface units; also deep well cooker and bake or roast with the cabinet shown in phantom;

Fig. 26 is a view in section taken on the line 26—26 of Fig. 24;

Fig. 27 is an isometric view illustrating another arrangement of the trays and showing the arrangement of the trays for four surface units and to broil or barbecue, with the range cabinet shown in phantom;

Fig. 28 is a view in section taken on the line 28—28 of Fig. 27;

Fig. 29 is a view in section taken on the line 29—29 of Fig. 28;

Fig. 30 is a view in section taken on the line 30—30 of Fig. 29;

Fig. 31 is an isometric view with parts broken away illustrating a means for hinging the oven door of the cabinet;

Fig. 32 is an exploded isometric view of the range cabinet and arrangement of the trays therein illustrated in Fig. 1;

Fig. 33 is an isometric view of the reverse side of the tray shown in Fig. 2;

Fig. 34 is an isometric view of the reverse side of the tray shown in Fig. 5;

Fig. 35 is an isometric view of the reverse side of the tray illustrated in Fig. 3; and Fig. 36 is an isometric view of the tray illustrated in Fig. 4, the tray being turned 180° from its position in Fig. 4.

Figure 11:
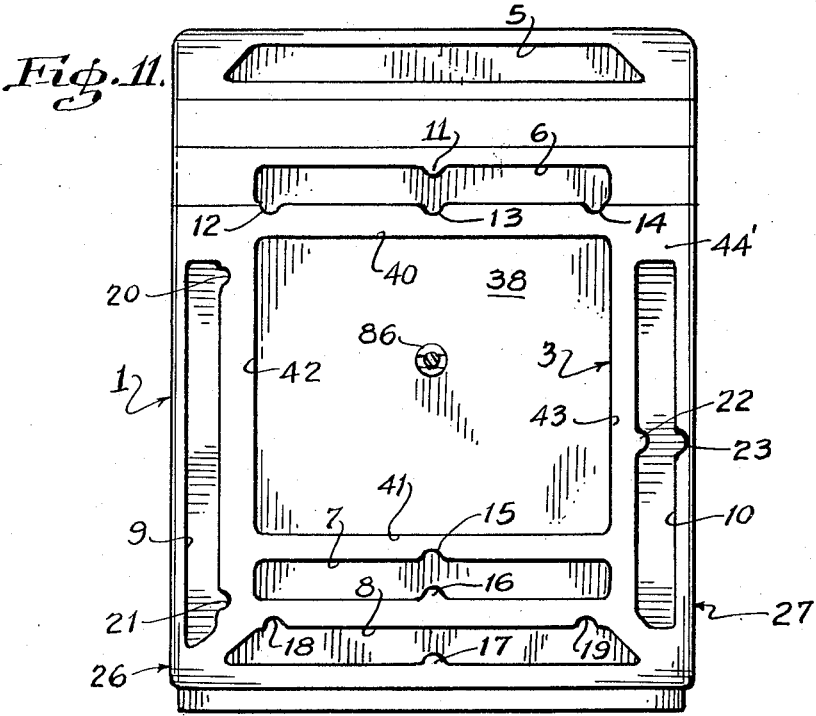
Fig. 11 is a schematic outline view of the cabinet similar to Fig. 9 with all of the trays removed to show the cabinet openings and the key slots.

The electrical stove of my invention as illustrated in the drawings comprises, when fully assembled, a four-sided box-like cabinet 1 with a bottom plate 57 (see Fig. 10) and an open canopy top 2 which is closed by one of the receptacles or trays described below when it is slid into cooking position, as noted hereinafter.

The front of the cabinet 1 is provided with an opening 39' into which is hingedly mounted an oven door 44 (see Fig. 10). As more clearly seen in Fig. 11, a front plate 44' having a number of tray openings therein is positioned about the opening 39'.

Tray openings 5, 6, 7, 8, 9 and 10 in plate 44' are furnished with key 11 and keying slots or keyways 12, 13, and 14 in the tray opening 6, slot 15 and key 16 in the opening 7; key 17 and slots 18 and 19 in the opening 8; slots 20 and 21 in the opening 9; and key 22 and slot 23 in the opening 10. Openings 5 and 8 are of trapezoidal shape, while openings 6 and 7 are substantially rectangular, and openings 9 and 10 are beveled at their lower inner corners, opening 9 having a larger beveled portion than opening 10.

On the front of the cabinet adjacent the top, a panel is formed with an inclined surface 24 (see Fig. 1) into which are mounted the control knobs which are dual units comprising the small inner knobs 25a and the larger outer knobs 25b, each being separately operable and controlling different heating elements and by the manipulation of which the user regulates the different heating elements. These knobs also control the "on" and "off" positions of the electrical current to the various heating units.

The side panels 26 and 27 (see Fig. 9) have no openings and the back panel 54 has, adjacent the bottom of the plate 57, the small opening 30 for the electrical outlet 31 (see Fig. 10).

Figure 12:
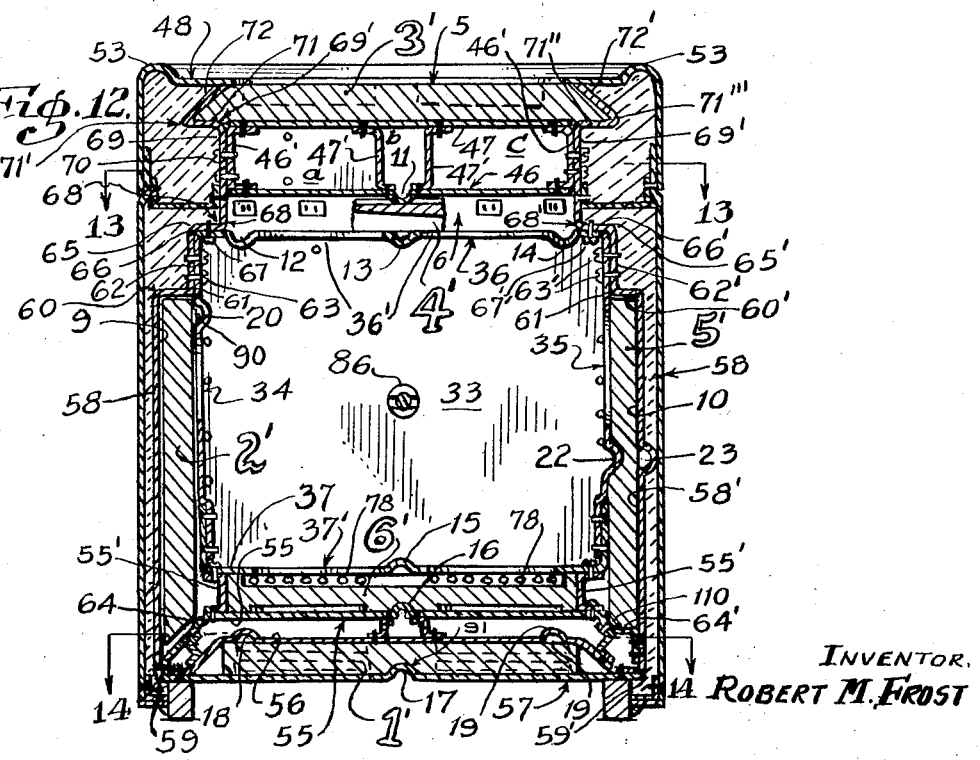
Fig. 12 is a view in section taken on the line 12—12 of Fig. 10.
Figure 13:
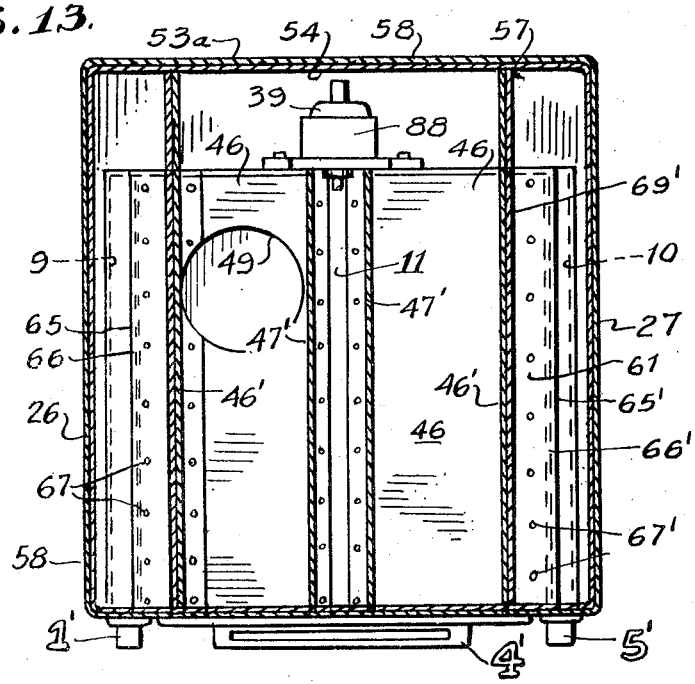
Fig. 13 is a view in section taken on the line 13—13 of Fig. 12.
Figure 14:
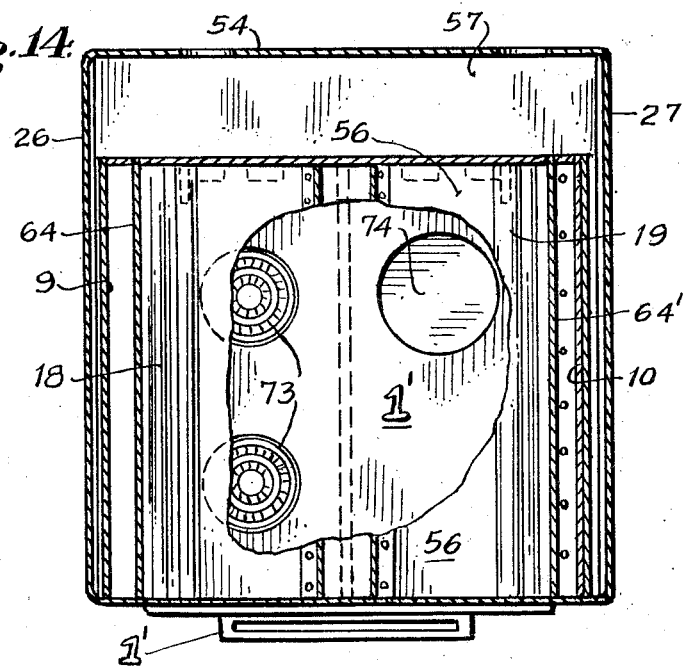
Fig. 14 is a view in section taken on the line 14—14 of Fig. 12.
Figure 16:
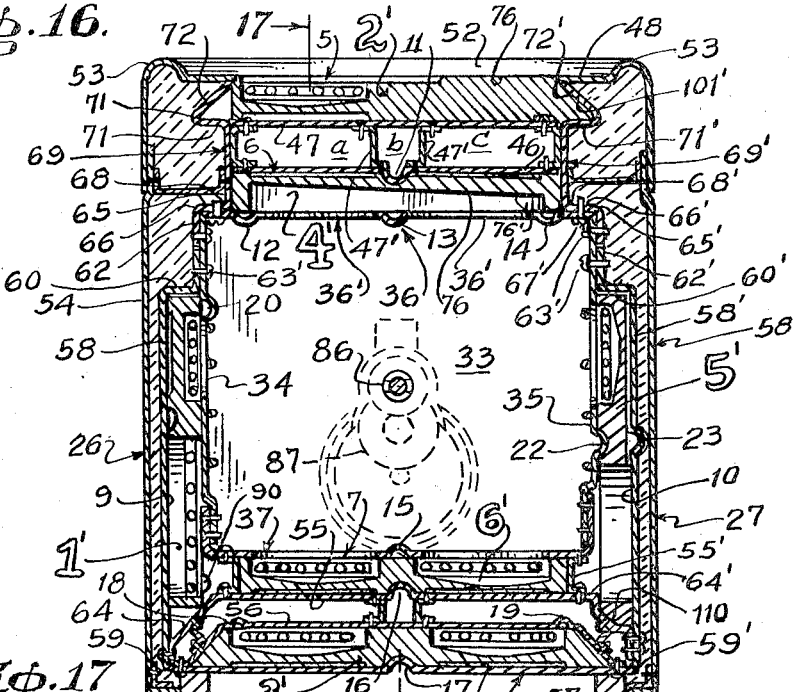
Fig. 16 is a view in section taken on the line 16—16 of Fig. 15.
Figure 17:
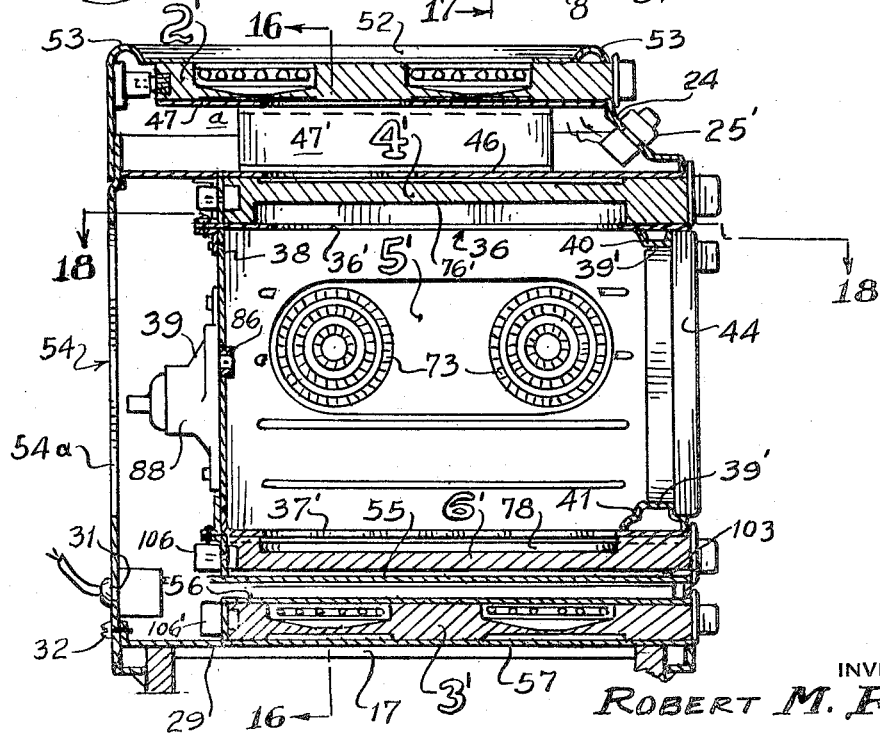
Fig. 17 is a view in section taken on the line 17—17 of Fig. 16.

The bottom plate 57 is made fast to the back plate 54 by the screws 32 (see Figs. 10 and 17). Referring to Figs. 12 and 16, the inside of cabinet 1 is constructed with an oven compartment 33 having side plates 34 and 35, the top plate 36 with the large openings 36', and the bottom plate 37, with the large openings 37'. All of these plates are furnished with bent portions forming tray identifying keys or keyways, and in combination with certain other plates of the structure described below form the respective tray openings or pockets. Thus, the bent portion of plate 34 forms keying slot 20 of tray opening 9; that of plate 36 forms slots 12, 13, and 14 of opening 6, the bent portion of plate 35 forms slot 22 of opening 10; and that of plate 37 forms slot 15 of tray opening 7. All of the tray openings or pockets of the range also have the configurations rectangular, trapezoidal, or beveled, depending on whether the trays hereinafter described are to fit into the rectanguar, trapezoidal or beveled-shaped openings.

As seen in Figs. 16 and 17, the oven is enclosed at its rear to form a box-like compartment by means of plate 38 having mounted at its back a motor and gear reduction housing 39, the purpose of which will be more fully described herein below.

Referring particularly to Figs. 10 and 11, the front of the cabinet, about the oven door opening 39', is framed by the top member 40, the bottom member 41, and the side members 42 and 43 which are formed integrally with the front plate 44' of the cabinet. The door 44 for enclosing the front opening 39' of the oven is of the conventional type and is mounted on hinges 45, as illustrated in Fig. 31.

Figure 24:
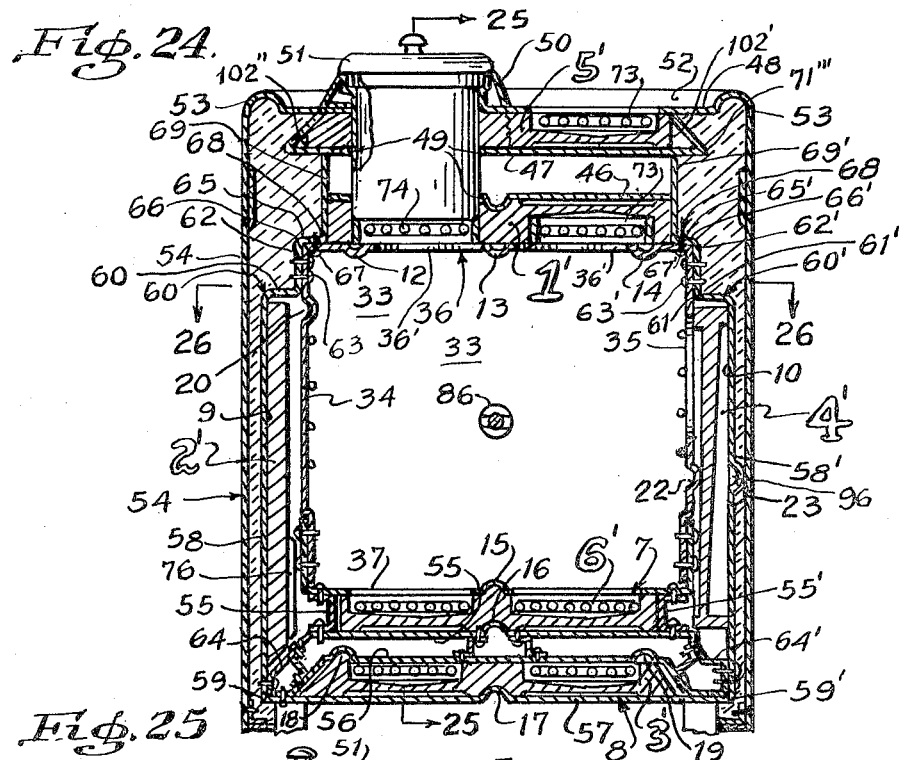
Fig. 24 is a view in section taken on the line 24—24 of Fig. 23.
Figure 25:
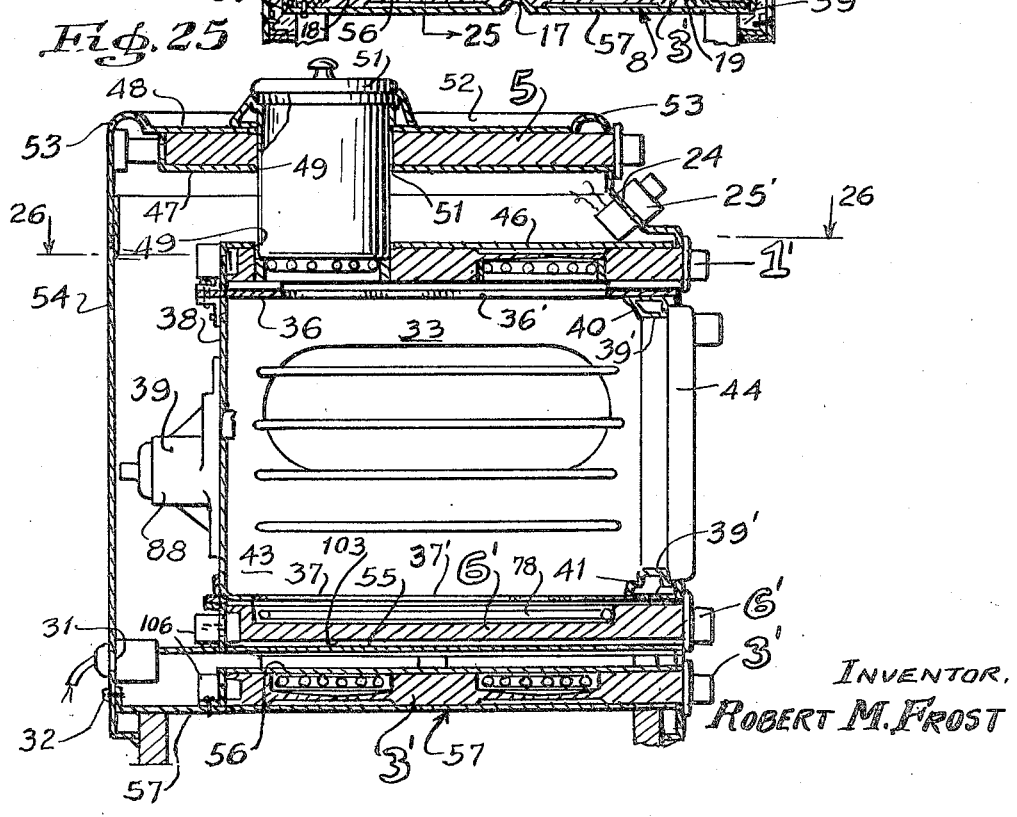
Fig. 25 is a view in section taken on the line 25—25 of Fig. 23.

Turning now to Fig. 12, above top plate 36 of the oven and below the top closure plate 48 of the cabinet are mounted spaced-apart parallel plates 46 and 47. These plates are fastened at their ends to channel members 46' and at their center portions to Z-shaped members 47' to form a supporting unit having air spaces a, b, and c. The plates 46 and 47 each have a circular opening 49 therein, these openings being in vertical alignment to form an opening into which a deep cooking receptacle 51 can be nested (see Figs. 24 and 25). Plate 46 also has a bent portion intermediate the Z-shaped members 47', forming key 11 of tray opening or pocket 6.

The open top plate 48 (see Figs. 1 and 16) is formed with the depressed portion 52 formed by the bead 53 which extends around the four top outer edges of the cabinet, and the outer portion of the bead 53 continues in a downward direction to form the four vertical side walls of the range cabinet.

Returning again to Fig. 12, positioned below and spaced parallel to plate 37 of the oven is the plate 55. These two plates with vertical side members 55' connecting the adjacent ends thereof form the tray pocket 7, plate 55 having a bent portion forming key 16 of this pocket. Positioned below plate 55 and spaced therefrom is the plate 56 which, with the bottom plate 57, forms the bottom tray pocket 8 of the cabinet. Plate 56 is bent at its ends to form downwardly sloping end portions which are connected to the extremities of plate 57, giving pocket 8 its trapezoidal shape. These plates have bent portion therein forming key 17 and slots 18 and 19.

The plates extending from the bottom plate 57 to the top plate 48 (see Fig. 12) of the cabinet are connected to and mounted upon the plate 57 to form one unit about which the casing of the oven may be positioned. The side portion 58 of the plate 57 is bent and fastened as follows: Plate 57 is bent at 90° at one end 59 to form upwardly extending plate 58. The latter is bent inwardly at 90° at its upper end to form a horizontal portion 60 just above the bend in plate 34 forming slot 20, and is again bent at 61 to form the vertical portion 62 which is fastened to plate 34 of the oven by screws 63. Plate 55 has at one end a downwardly bent angular portion 64 connected at its extremity to the bottom of plate 58. Plates 34, 58, with its horizontal portion 60, and 64 define tray pocket 9, plate 64 forming the lower beveled end of this pocket or opening.

The vertical portion 62 of the plate 58 is again bent at 90° at 65 to form a flange 66 to which plate 36 of the oven is attached by screws 67. At the inner portion of the flange 66 the plate is again bent at 90° at 68 and the upstanding portion 69 so formed is connected to the channel member 46' by screws 70. Portion 69 is bent outwardly at its upper end to form flange 71 and is again bent inwardly at 71' to form an upwardly sloping side member 72, the upper end of which is attached to top plate 48.

Plate 57 is bent at 90° at its other end 59' to form upwardly extending plate 58', a bent portion being provided therein opposite bent portion 22 of plate 35 to form slot 23 of tray pocket 10. Plate 58' is bent inwardly at 90° at its upper end to form a horizontal portion 60', the latter portion being bent at right angles at its inner end to form a vertical member 62' which is fastened to plate 35 by screws 63'. Plate 55 has at its end adjacent plate 58' a horizontal outwardly extending bent portion 64' which is connected at its outer end to the bottom of plate 58'. The plates 35 and 58' and the horizontal portions 60' and 64' define tray pocket 10.

Vertical member 62' is bent inwardly at right angles at its upper end 65' to form flange 66' to which plate 36 is connected by means of screws 67' at its end adjacent plate 35. The flange is again bent upwardly at its inner end 68', and the so-formed vertical portion 69' is connected to the other channel 46' by means of screws. The upper end of the latter portion is bent outwardly to form flange 71'' which in turn is bent inwardly at its extremity 71''' to form an upwardly sloping angle member 72', the upper end of which is also attached to top plate 48.

Plate 47, flanges 71 and 71'', angle members 72 and 72', and plate 48 form the trapezoidally shaped opening or pocket 5, and plates 36 and 46 and the lower portions of vertical members 69 and 69' together define the rectangular tray pocket 6.

All of the open spaces in the range adjacent the vertical side walls of the cabinet except the tray pockets are filled with an insulating material such as fiber glass or other suitable insulation. The back plate 54 of the cabinet (see Fig. 10) is provided with a plurality of slots 54a for ventilation.

The tray 1' illustrated in Figs. 7 and 8 is supplied with two circular surface heating units 73 on one side of the tray containing keys 90 (Fig. 8) and one larger circular heating unit 74 on the side containing keyway 91 (see Fig. 7). This tray is adapted to be entered only into tray pockets 6, 8, and 9 in the stove cabinet (see Fig. 11), the keys 90 of the tray mating with slots 12 and 14, slots 18 and 19, and slots 20 and 21 of these pockets respectively, and keyway 91 of the tray mating with keys 11 and 17 of pockets 6 and 8, respectively, both sides 100 of this tray being vertical for this purpose. It is seen that the width of this tray is the same as the width of pocket 6, and hence the tray does not occupy the beveled end portions of pockets 8 and 9. When inserted into pocket 9 (see Fig. 16), tray 1' rests on keyways 20 and 21, with its down edge just above the beveled portion of this pocket. Further, it is seen that when tray 1' is in pocket 6, heating unit 74 is located on its upper side and when this tray is in pocket 8 heating units 73 thereof face upwardly.

The tray 2' illustrated in Figs. 4 and 36 is supplied with two surface circular heating units 75 and with the griddle unit 76 and grease pocket 77'. This tray has no keys or slots thereon and has one side edge 101 vertical, the other edge 101' being beveled (see Fig. 36) so that it fits into the right-hand end portion of tray pocket 5 (see Fig. 16) and the lower beveled end portion of pocket 9 (see Fig. 24). This tray thus fits and is adapted to be entered only into tray pockets 5 and 9 in the stove cabinet.

The tray 3' illustrated in Figs. 2 and 33 is supplied with the four circular heating units 73, and has both its side edges beveled as at 92, the surface opposite to that containing the heating units being provided with a keyway 93. This tray is adapted to be entered only into the trapezoidal pockets 5 and 8 in the stove cabinet, keyway 93 mating with key 17 of pocket 8 when the tray is inserted therein. This tray is in an operative position when in pocket 5.

The tray 4' illustrated in Figs. 3 and 35 has no heating units, the center portion 76' being depressed and inclined in two directions, i. e., to the right and forward as viewed in Fig. 3, to cause the drippings to flow to the lower right-hand corner of the depression. The depression is located on the side of the tray containing keys 96 to provide a receptacle to catch the drippings from the food while it is being cooked, the other side having keyway 97. This tray has both its side edges 102 vertical and is adapted to be entered only into the tray pockets 6, 7, and 10 of the stove cabinet, keys 96 of the tray mating with slots 13, 15, and 23 of these pockets, and keyway 97 of this tray mating with keys 11, 16, and 22 of such pockets, respectively. This tray is in operative position when in pocket 6. Tray 4' has a width equal to that of tray pockets 6 and 7, and when inserted into pocket 10 rests on key 22 and keyway 23, with its lower edge just above the beveled portion of pocket 10 (see Fig. 24).

Figure 15:
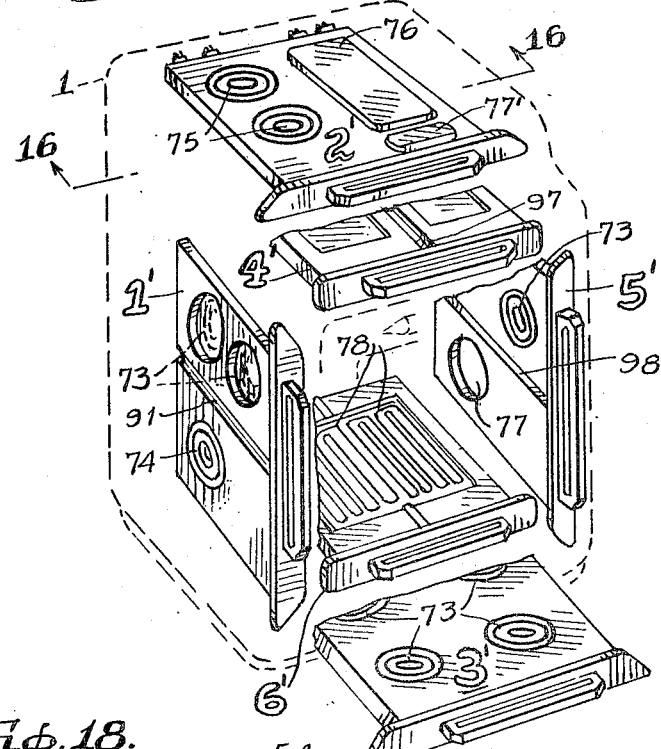
Fig. 15 is an isometric view illustrating one arrangement of the trays for two surface units with griddle and to bake or roast showing the range cabinet in phantom.
Figure 18:
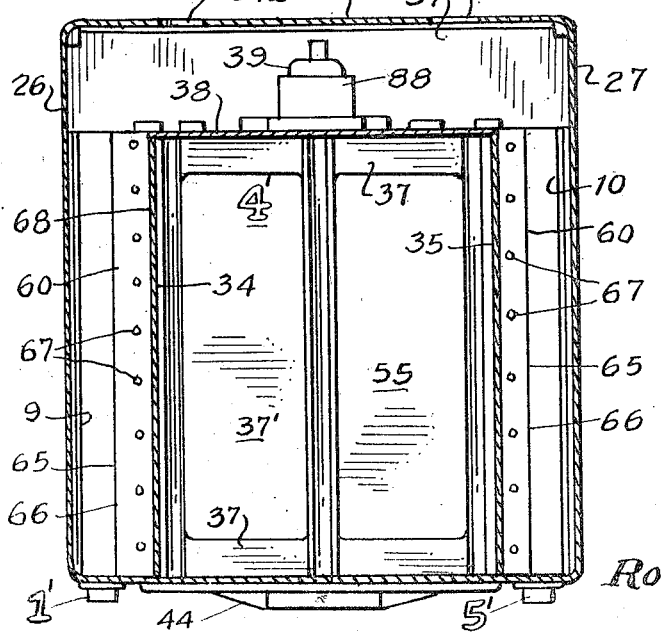
Fig. 18 is a view in section taken on the line 18—18 of Fig. 17.

The tray 5' illustrated in Figs. 5 and 34 is supplied with two circular surface burners 73 on the side thereof containing keyway 98 and a circular opening 77 through the tray. This tray is adapted to be entered only into the tray pockets 5 and 10 in the cabinet, keyway 98 mating with key 22 of pocket 10 when the tray is inserted therein, as illustrated in Fig. 15. The overall width of this tray is somewhat greater than the length of the top edge of pocket 5 (see Fig. 11), the tray having one vertical side 102', the other side 102'' having a beveled edge 110 (see Fig. 34) which fits into the left trapezoidal end portion of pocket 5 (see Fig. 24) and also into the lower beveled portion of pocket 10 (see Fig. 16). Because of the greater width of tray 5' it will not fit into pockets 6 and 7, and because of side 102'' containing beveled edge 110 this tray will not fit into pockets 8 and 9.

Figure 19:
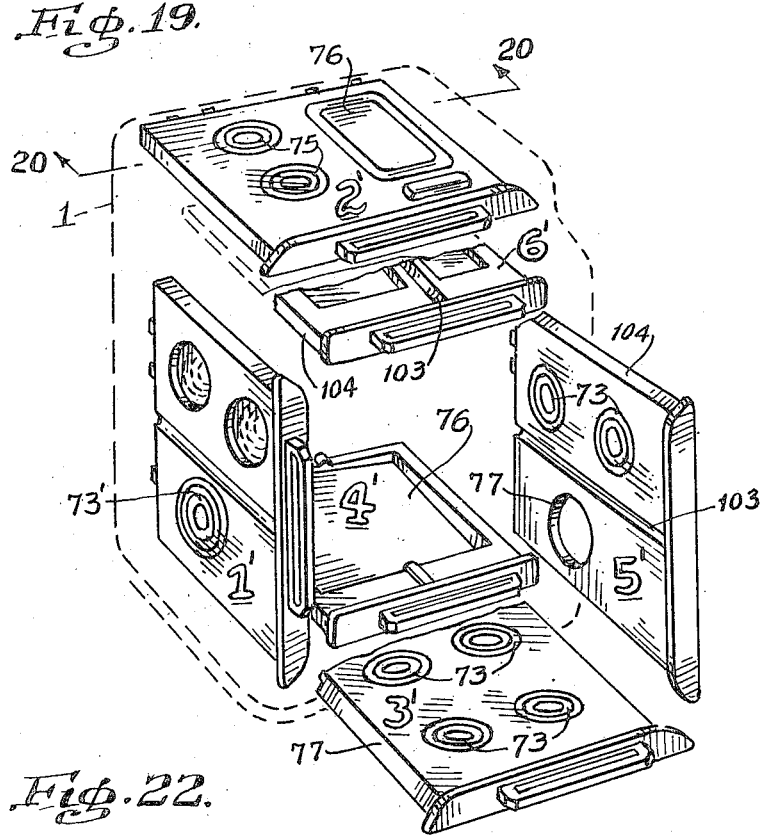
Fig. 19 is a view similar to Fig. 15, illustrating another arrangement of the trays for two surface units with griddle and to broil or barbecue, the range cabinet being shown in phantom.

The tray 6' illustrated in Fig. 6 is supplied with rectangular heating units 78 on the key-containing side 99 of the tray, a keyway 103 being formed on the opposite side thereof (see Fig. 19). This tray has vertical sides 104 and is adapted to be entered only into the tray pockets 6, 7, and 10 of the stove cabinet, the tray keys on side 99 thereof fitting into slots 13, 15, and 23 of pockets 6, 7, and 10, and tray keyway 103 mating with keys 11, 16, and 22 of pockets 6, 7, and 10, respectively. Tray 6' has a width equal to that of tray pockets 6 and 7, and when inserted into pocket 10, the tray rests on key 22 and keyway 23, with its lower edge just above the beveled portion of pocket 10.

It is noted that five of the trays are provided with heating units, and a sixth tray, which has no heating unit, is used to receive the drippings from the food as it is cooking. It is to be understood that the trapezoidal, rectangular and beveled configurations of the tray pockets and of the trays mating therewith also constitute cooperating keys and keyways according to this invention.

The range fabricated as described above and illustrated in the drawings can be adapted by different arrangement and juxtaposition of the trays to several cooking combinations by selectively inserting the trays in their allotted places or pockets. Different arrangements of these trays in their allotted pockets will provide the following five cooking combinations: (1) Bake or roast with four top surface heating units (see Figs. 1 and 32); (2) bake or roast with two top surface units and a griddle (see Fig. 15); (3) broil or barbecue with two top surface units and griddle (see Fig. 19); (4) bake or roast with two top surface heating units and deep well cooker (see Fig. 23); and (5) broil or barbecue with four top surface heating units (see Fig. 27).

To obtain the combination to bake or roast and the use of four top heating units, which is the first cooking combination listed above, the tray 1' is placed in the cabinet pocket 8; tray 2' is placed in pocket 9; tray 3' is placed in pocket 5; tray 4' is placed in pocket 6; tray 5' is placed in pocket 10; and tray 6' is placed in pocket 7 (see Figs. 1 and 32 of the drawings).

To obtain the second combination for baking or roasting and the use of two surface heating units and griddle on the top, tray 1' is placed in pocket 9; tray 2' is placed in pocket 5; tray 3' is placed in pocket 8; tray 4' is placed in pocket 6; tray 5' is placed in pocket 10; and tray 6' is placed in pocket 7 (see Fig. 15 of the drawings).

To obtain the third combination listed above with the use of two top surface heating units and the griddle on the top, and also permitting broiling or barbecuing, tray 1' is placed in pocket 9; tray 2' is placed in pocket 5; tray 3' is placed in pocket 8; tray 4' is placed in pocket 7; tray 5' is placed in pocket 10 and unit 6' is inserted in pocket 6 (see Fig. 19).

To obtain the fourth combination listed, having two surface heating units and the deep well cooker on the top and to bake or roast, tray 1' is placed in pocket 6; tray 2' is placed in pocket 9; tray 3' is placed in pocket 8; tray 4' is placed in pocket 10; tray 5' is placed in pocket 5, and tray 6' is placed in pocket 7 (see Fig. 23).

To obtain the fifth combination listed, having four top surface heating units and to broil or barbecue, tray 1' is placed in pocket 8; tray 2' is placed in pocket 9; tray 3' is placed in pocket 5; tray 4' is placed in pocket 7; tray 5' is placed in pocket 10; and tray 6' is placed in pocket 6 (see Fig. 27).

Figure 22:
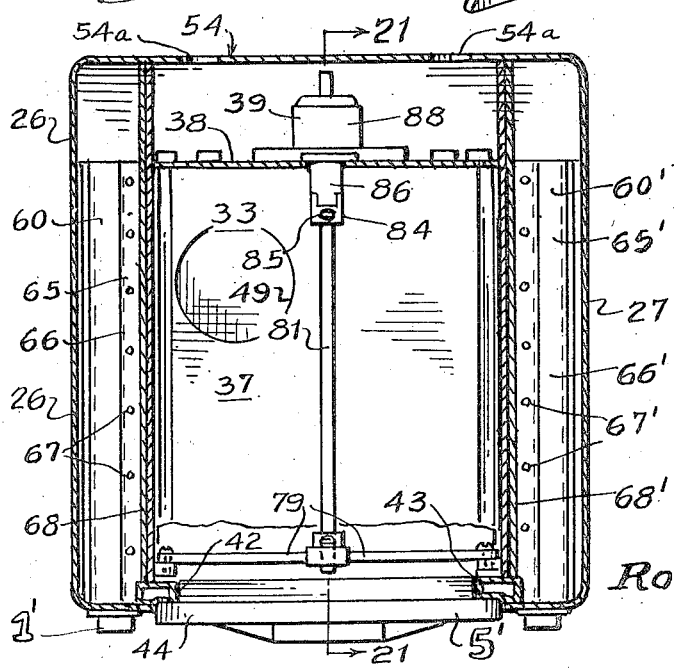
Fig. 22 is a view in section taken on the line 22—22 of Fig. 20.

As illustrated in Figs. 21, 22, and 29, the range or stove can be equipped for barbecuing by mounting on bearing 80 of frame 79 a spit 81 which is maintained in position on the bearing by the collar 82 held in place by thumbscrew 83. On the inner end adjacent the motor, the spit 81 is provided with a clutch 84 which is locked in place by the thumbscrew 85 so it and the collar 82 may be removed to dismount the spit 81. The clutch 84 is engaged by the clutch jaws of the hub 86 which protrudes into the oven space from the reduction gear in the housing 87 in which the motor 88 is also mounted. The housing 87 is attached to the oven back plate 38 by the screws 89 (see Figs. 21 and 29).

All of the trays except tray 4' (see Figs. 2 to 8) have electric plugs or contacts 105 secured to the rear of these trays. Each of these plugs is connected to a separate heating element on the trays in a conventional manner (not shown). When the trays are inserted into their respective tray pockets or openings, these plugs are automatically inserted into cooperating sockets 106 positioned at the rear of the range (see Fig. 10). However, since any tray which can be inserted in pocket 8 is not operative in this pocket, pocket 8 being for interim storage only, in the embodiment shown, socket 106' at the rear of this pocket is provided merely to accommodate contacts 105 on trays 1 and 3 when these trays are inserted into pocket 8, and sockets 106' do not make electrical contact with any control knobs on the range or with any source of power.

It is noted from the above description directed to a preferred embodiment of the invention that the interchangeable units or trays of the device in cooperation with their respective mating pockets in the range or stove provide a plurality of conjoint systems, each enabling various types of cooking methods to take place singly or at one and the same time. These systems are readily transformed from one to another and the device in all of its operative forms is compact, readily assembled, and reassembled, and easily cleaned and maintained in working order. The keying or mating feature of the different trays or units for insertion into only certain predetermined pockets of the invention range enables only pre-selected operative cooking combinations to be assembled and prevents the assembly of inoperative cooking combinations which might otherwise be effected by mistakenly inserting a tray in the incorrect pocket. According to the embodiment of the invention shown and described, each tray pocket accepts for insertion therein at least two predetermined ones of the various trays, while rejecting the others.

While I have described a particular embodiment of my invention for the purpose of illustration, it should be understood that various modifications and adaptations thereof may be made within the spirit of the invention as set forth in the appended claims.

I claim:

1. In an electric range, a cabinet, a front opening in said cabinet and a closure therefor, a plurality of compartments positioned in said cabinet adjacent said opening, each of said compartments having an opening in the front of said cabinet, guide means in each of said compartments, a plurality of receptacles each arranged to be slidably inserted through said guide means into a compartment, at least one of said receptacles having at least one electric heating element therein, and means on said guide means and receptacles to permit the last-named means of each compartment to accept for insertion therein at least two predetermined ones of said receptacles and prevent the insertion of at least another predetermined one of said receptacles.

2. In an electric range, a cabinet, a front opening in said cabinet and a closure therefor, a plurality of multiplanar compartments positioned in said cabinet about said opening, each of said compartments having an opening in the front of said cabinet, guide means in front of each of said compartments, a plurality of receptacles each arranged to be slidably inserted through said guide means into a compartment, more than one of said receptacles each having a plurality of electric heating elements therein, said guide means and receptacles having a cooperating system of keys and keyways such that the guide means of each compartment will accept for insertion therein at least two predetermined ones of said receptacles and prevent the insertion of the remainder of said receptacles, said keys and keyways being arranged to permit all of said compartments to be occupied by all of said receptacles in each of the operative mating combinations of said compartments and said receptacles.

3. In an electric range, a cabinet, a front opening in said cabinet and a closure therefor, an oven in said cabinet communicating with said opening, a plurality of compartments disposed about said oven adjacent thereto, each of said compartments having an opening in the front of said cabinet, guide means in the opening of each of said compartments, a plurality of receptacles each arranged to be slidably inserted through said guide means into a compartment, more than one of said receptacles each having a plurality of electric heating elements therein, said last-mentioned receptacles having different arrangements of said heating elements, said guide means and receptacles having a cooperating system of keys and keyways such that the guide means of each compartment will accept for insertion therein at least two predetermined ones of said receptacles and prevent the insertion of the remainder of said receptacles to thereby provide a plurality of cooking combinations, said keys and keyways being arranged to permit all of said compartments to be occupied by all of said receptacles in each of the operative mating combinations of said compartments and said receptacles.

4. In an electric range, a cabinet, a front opening in said cabinet and a closure therefor, an oven in said cabinet communicating with said opening, a plurality of multiplanar compartments disposed adjacent the top, bottom and sides of said oven, each of said compartments being separate from said oven and having an opening in the front of said cabinet, guide means in the opening of each of said compartments, a plurality of essentially flat receptacles each arranged to be slidably inserted through said guide means into a compartment, more than one of said receptacles each having a plurality of electric heating elements therein, said last-mentioned receptacles having different arrangements of said heating elements, cooperating means on said guide means and receptacles permitting the guide means of each compartment to accept for insertion therein at least two predetermined ones of said receptacles and preventing the insertion of the remainder of said receptacles to thereby provide a plurality of conjoint cooking systems each enabling various types of cooking methods to be employed, said cooperating means being arranged to permit all of said compartments to be occupied by all of said receptacles in each of the operative mating combinations of said compartments and said receptacles.

5. In an electric range, a cabinet, a front opening in said cabinet and a closure therefor, an oven in said cabinet communicating with said opening, a plurality of multiplanar compartments disposed adjacent the top, bottom and sides of said oven, each of said compartments having an opening in the front of said cabinet, guideways in the opening of each of said compartments, a plurality of essentially flat receptacles, each arranged to be slidably inserted through said guideways into a compartment, more than one of said receptacles each having a plurality of electric heating elements therein, said last-mentioned receptacles having different arrangements of said heating elements, a system of keys and cooperating slots on said guideways and receptacles permitting the guideways of each compartment to accept for selective insertion therein at least two predetermined mating receptacles and preventing insertion of the remainder of the receptacles which are non-mating, electric contacts secured to said heating element-containing receptacles and connected to said heating elements, and electrical terminals on said range adapted to engage said contacts on insertion of said last-mentioned receptacles into their respective compartments, said keys and keyways being arranged to permit all of said compartments to be occupied by all of said receptacles in each of the operative mating combinations of said compartments and said receptacles.

6. In an electric range, a cabinet, a front opening in said cabinet and a closure therefor, an oven in said cabinet communicating with said opening, a plurality of pockets disposed adjacent the top, bottom and sides of said oven, each of said pockets having an opening in the front of said cabinet, a plurality of tray-like receptacles each adapted to be slidably inserted into a pocket so that all of said pockets are occupied, a majority of said receptacles each having a plurality of electric heating elements therein, said last-mentioned receptacles having different arrangements of said heating elements, at least one of said receptacles being a tray without heating elements, a system of keys and cooperating slots arranged on said receptacles and the edges adjacent the openings of said pockets permitting each of said pockets to accept for selective insertion therein at least two predetermined mating receptacles and preventing insertion of the remainder of the receptacles which are non-mating, said keys and keyways being arranged to permit all of said compartments to be occupied by all of said receptacles in each of the operative mating combinations of said compartments and said receptacles.

7. In an electric range, a cabinet, a front opening in said cabinet and a closure therefor, an oven in said cabinet communicating with said opening, a pair of horizontal pockets disposed above and a pair of horizontal pockets below said oven, a vertical pocket disposed on each side of said oven, each of said pockets having an opening in the front of said cabinet, six tray-like receptacles each adapted to be slidably inserted into a pocket so that all of said pockets can be occupied simultaneously, a majority of said receptacles each having at least two electric heating elements therein, said last-mentioned receptacles having different arrangements of said heating elements, at least one of said receptacles being a tray without a heating element, cooperating means on said receptacles and the edges adjacent the opening of said pockets permitting each of said tray-like receptacles to be selectively inserted into at least two of said pockets to thereby provide a plurality of conjoint cooking systems each enabling various types of cooking methods to be employed, electric contacts secured to said heating element-containing receptacles and connected to said heating elements, and electrical terminals on said range adapted to engage said contacts on insertion of said last-mentioned receptacles into their respective pockets.

8. In an electric range, a cabinet, a front opening in said cabinet and a closure therefor, an oven in said cabinet communicating with said opening, a pair of horizontal pockets disposed above and a pair of horizontal pockets below said oven, a vertical pocket disposed on each side of said oven, each of said pockets having an opening in the front of said cabinet, six tray-like receptacles each adapted to be slidably inserted into a pocket so that all of said pockets can be occupied simultaneously, a first one of said receptacles having three surface heating elements, a second having two such elements and a griddle unit, a third having four such elements, a fourth being a tray without a heating element, a fifth having two such elements and means to accommodate a deep well cooker, and the sixth having rectangular heating elements, a system of keys and cooperating slots arranged on said receptacles and the edges adjacent the openings of said pockets permitting each of said pockets to accept for selective insertion therein at least two predetermined mating receptacles and preventing insertion of the remainder of the receptacles which are non-mating, to thereby provide a plurality of conjoint cooking systems each enabling various types of cooking methods to be employed.

9. In an electric range, a cabinet, a front opening in said cabinet and a closure therefor, an oven in said cabinet communicating with said opening, a first and a second lower horizontal pocket both disposed above said oven, a third and a fourth horizontal pocket successively disposed below said oven and a fifth and sixth vertical pocket each disposed at opposite sides of said oven, each of said pockets having an opening in the front of said cabinet, six tray-like receptacles each adapted to be slidably inserted into a pocket so that all of said pockets can be occupied simultaneously, a first one of said receptacles having three surface heating elements, a second having two such elements and a griddle unit, a third having four such elements, a fourth being a tray without a heating element, a fifth having two such elements and means including an opening to accommodate a deep well cooker, and the sixth having rectangular heating elements, a system of keys and cooperating slots arranged on said receptacles and the edges adjacent the openings of said pockets permitting said first receptacle to be inserted only into said second, fourth and fifth pockets, said second receptacle only into said first and fifth pockets, said third receptacle only into said first and fourth pockets, said fourth receptacle only into said second, third and sixth pockets, said fifth receptacle only into said first and sixth pockets, and said sixth receptacle only into said second, third, and sixth pockets, to thereby provide a plurality of conjoint cooking systems each enabling various types of cooking methods to be employed.

10. In an electric range as defined in claim 9, the combination permitting baking or roasting and the use of four top surface heating elements, wherein said first, second, third, fourth, fifth, and sixth receptacles are respectively inserted into said fourth, fifth, first, second, sixth, and third pockets.

11. In an electric range as defined in claim 9, the combination permitting baking or roasting and the use of two surface heating elements and griddle on top, wherein said first, second, third, fourth, fifth and sixth receptacles are respectively inserted into said fifth, first, fourth, second, sixth and third pockets.

12. In an electric range as defined in claim 9, the combination permitting broiling or barbecuing and the use of two surface heating elements and griddle on top, wherein said first, second, third, fourth, fifth and sixth receptacles are respectively inserted into said fifth, first, fourth, third, sixth and second pockets.

13. In an electric range as defined in claim 9, the combination permitting baking or roasting and the use of two surface heating elements and deep well cooker on top, wherein said first, second, third, fourth, fifth and sixth receptacles are respectively inserted into said second, fifth, fourth, sixth, first and third pockets.

14. In an electric range as defined in claim 9, the combination permitting broiling or barbecuing and the use of four top surface heating elements, wherein said first, second, third, fourth, fifth and sixth receptacles are respectively inserted into said fourth, fifth, first, third, sixth and second pockets.

15. In an electric range, a cabinet, a front opening in said cabinet and a closure therefor, an oven in said cabinet communicating with said opening, a plurality of horizontal slots disposed adjacent the top and bottom of said oven, a plurality of vertical slots disposed adjacent the sides of said oven, each of said slots having an opening in the front of said cabinet, a plurality of tray-like receptacles each adapted to be slidably inserted into a slot so that all of said slots are occupied, more than one of said receptacles each having an electric heating element therein, and a cooperating system of keys and keyways on said receptacles and the outer edges of said slots permitting each of said receptacles to fit into at least two predetermined mating slots but not all of said slots, to thereby provide a plurality of conjoint cooking systems enabling various types of cooking methods to be employed, said keys and keyways being arranged to permit all of said compartments to be occupied by all of said receptacles in each of the operative mating combinations of said compartments and said receptacles.

References Cited in the file of this patent

UNITED STATES PATENTS

| | | |
|---|---|---|
| 1,179,340 | Smith | Apr. 11, 1916 |
| 1,213,595 | Deal | Jan. 23, 1917 |
| 1,431,953 | Henoch | Oct. 17, 1922 |
| 2,281,958 | Snavely | May 5, 1942 |
| 2,526,476 | Ham | Oct. 17, 1950 |
| 2,561,125 | Leibowitz | July 17, 1951 |
| 2,618,730 | Panken | Nov. 18, 1952 |
| 2,668,222 | McCormick | Feb. 2, 1954 |

FOREIGN PATENTS

| | | |
|---|---|---|
| 592,986 | Great Britain | Oct. 6, 1947 |
| 600,388 | Great Britain | Apr. 7, 1948 |
| 616,550 | Germany | July 31, 1935 |